March 14, 1961  B. T. RULEY  2,975,008

SEPARATORS

Filed Jan. 29, 1958

INVENTOR
BRYCE T. RULEY
BY Edward H. Goodrich
HIS ATTORNEY

United States Patent Office 2,975,008
Patented Mar. 14, 1961

2,975,008
SEPARATORS

Bryce T. Ruley, Bristol, Conn., assignor to General Motors Corporation, Detroit, Mich., a corporation of Delaware Filed Jan. 29, 1958, Ser. No. 711,869
9 Claims. (Cl. 308—201)

This invention relates to separators for circumferentially spacing the rolling elements in an antifriction bearing and particularly to separators for use in bearings operated at very high speeds of rotation.

With the present demands for high speed spindles and high speed precision machinery, antifriction bearings are required which will operate for long unattended trouble-free periods at speeds that often exceed 100,000 rotations per minute. One of the common difficulties in operating precision ball bearings at such extremely high speeds resides in the fact that the usual annular separator which circumferentially spaces the balls cannot withstand these high rotational speeds and radially distorts or breaks apart under the resulting strong centrifugal forces. The narrow central webbed portions between the adjacent rolling elements in such a separator have frequently radially expanded or broken under the influence of these centrifugal forces causing the separator to improperly engage and inaccurately guide the rolling elements greatly increasing friction within the bearing and impeding rolling element operation usually resulting in short bearing life and sudden bearing failure. Frequently this separator distortion is of sufficient magnitude to wedge portions of the separator between the rolling elements and raceways which suddenly locks the bearing race rings from further relative rotation causing sudden bearing failure.

It is, therefore, an object of this invention to provide an improved separator for circumferentially spacing the rolling elements in an antifriction bearing and which will properly guide the rolling elements during high speed bearing operation without objectionable separator distortion.

It is a further object of this invention to provide an improved separator of simple construction and which is prestressed to withstand the centrifugal forces of high rotational speeds.

It is a further object to provide an improved separator having an arched contour which is radially stressed to prevent detrimental separator deformation under the influence of centrifugal forces of high speed separator rotation.

To these ends and also to improve generally upon devices of this character, the invention consists in the various matters hereinafter described and claimed. In its broader aspects, the invention is not necessarily limited to the specific structures selected for illustrative purposes in the accompanying drawings wherein:

Figure 1:
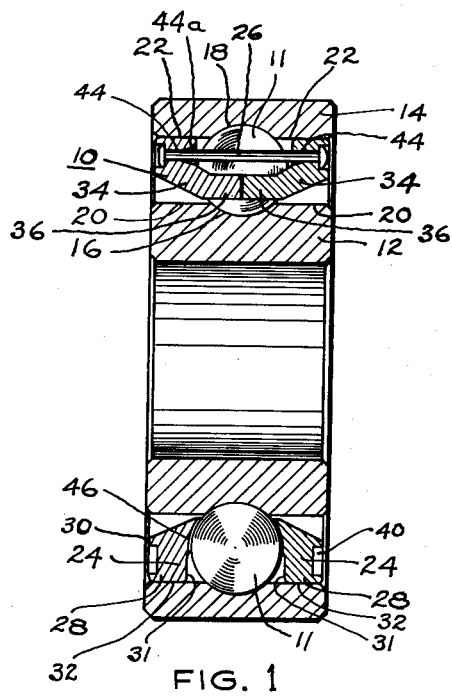
Figure 1 is a cross sectional view through a ball bearing embodying the improved separator.

A separator, as 10, guides a series of rolling elements, as balls 11, in circumferentially spaced relation between an inner race ring 12 and a coaxial outer race ring 14. These balls rollingly engage inner and outer raceways 16 and 18 in the race rings to provide relative race ring rotation. The inner race ring 12 has a pair of corresponding cylindrical lands 20 respectively located at each side of the raceway 16. The outer race ring 14 has a pair of cylindrical lands 22 located respectively at each side of the raceway 18. The separator 10 is preferably composed of a pair of similar annular members 24 held together under compression by a series of cooperating circumferentially spaced fastening elements as rivets 26. Each annular member 24 has an enlarged end ring flange 28 directed radially outwardly and provided with an outer end face 30, an inner face 31 and a cylindrical periphery 32 arranged to antifrictionally slide on one of the lands 22 in the presence of suitable bearing lubricant. A frusto-conical portion 34 extends axially and radially inwardly from each annular flange 28 and merges with a cylindrical ring portion 36 having an inner end wall 38. These frusto-conical portions 34 and ring portions 36 cooperatively form an intermediate separator portion which is generally arch-shaped radially inwardly in cross section as shown. This ring portion 36 is proximate to but spaced from the inner race ring 12. The securing members such as the rivets 26, are headed over at their opposite ends, these heads being preferably received within annular grooves 40 in the end walls of the flanges 28. These rivets extend respectively between adjacent rolling elements 11 and through corresponding bores 44 in each flange 28. Also, the end walls 38 of each ring are correspondingly and arcuately cut away to cooperatively provide circumferentially spaced pockets 46 for loosely receiving and guiding the balls 11 in the assembled separator. The cylindrical ring portion 36 is preferably located radially inwardly of the pitch circle of ball centers and the rivets 26 are preferably positioned radially outwardly of this pitch circle. With this arrangement, the assembled separator halves form a cross sectional contour that is generally arch-shaped towards the inner ring 12. When the separator is subjected to strong centrifugal forces resulting from very high speed of separator rotation, the tendency of the separator to objectionably distort radially and to break is effectively overcome by the tensioning stress of the rivets 26 between the end ring flanges 28.

The rivets 26 are preferably secured in position under a predetermined initial tension to firmly hold the end walls 38 in tightly abutting engagement and to provide a stress between the special ring flanges 28 which produces a radially inwardly directed stress component in the cylindrical ring portion 36 and within the frusto-conical walls 34. This rivet tension is sufficient to prevent detrimental outwardly radial separator distortion under the influence of the centrifugal forces of high speed separator rotation. To provide the required rivet tensions, these rivets may be headed over in position while the separator halves are temporarily clamped together with the end ring portions 28 very slightly sprung axially inwardly. The rivets and separator web adjacent to the rolling elements may be of such dimensions that they may resiliently yield very slightly within their elastic limits under conditions of very high speed operation to uniformly distribute separator stresses and prevent any tendency towards breakage. However, this yielding of separator parts is insufficient to cause any cramping action of the separator against the rolling elements 11. If desired, bolts may be used in place of these rivets to adjustably regulate the stress components which counteract detrimental radial distortions of the separator so that it may safely and effectively operate at extremely high rotational speeds. Also, in some instances it has been found desirable to slightly taper or relieve the inner ends of the bores 44, as at 44a, to allow transverse flexibility to the rivets 26 or to bolts passing through these bores. With this arrangement, the members 26 are only secured at their outer ends and concentration of bending is prevented since an intermediate part of each member 26 extending the major portion of its length is free to uniformly and laterally flex.

Figure 3:
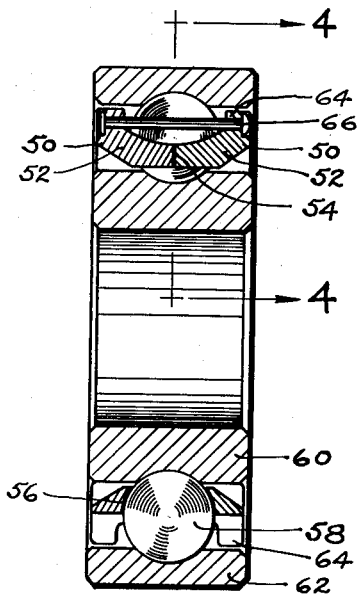
Figure 3 is a cross sectional view through a ball bearing showing a modified form of the separator.
Figure 2:
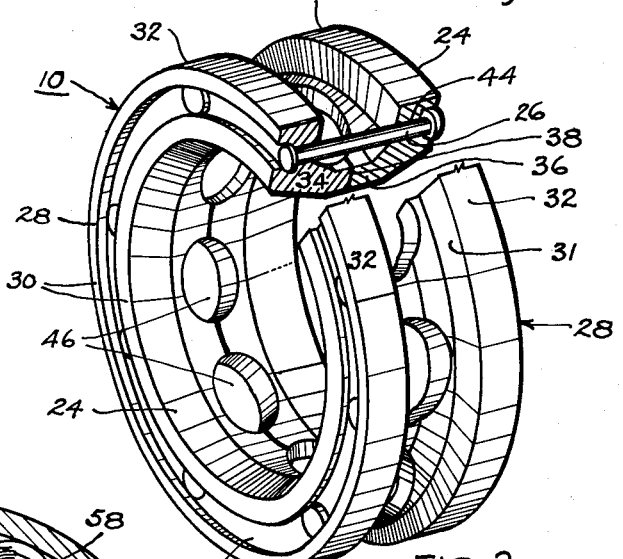
Figure 2 is a perspective view of the separator and is partly cut away to better illustrate the improved structure.
Figure 4:
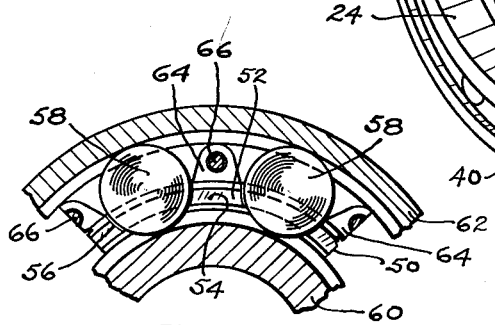
Figure 4 is a fragmentary end elevation taken generally along the line 4—4 in Figure 3 and showing another modified construction.

In the embodiment of Figures 3 and 4, there is shown a modified separator structure provided with two similar ring members 50 having axially inwardly extending portions 52 terminating in abutting end walls 54. The end walls are arcuately recessed to provide a series of circumferentially spaced pockets 56 for loosely receiving and guiding rolling elements 58 engaging within raceways in inner and outer race rings 60 and 62 in general accordance with the previously described construction. The cooperating annular abutting portions 52 form a common inner annular wall in spaced relation to the inner race ring 60. To reduce the weight of the separator, the end ring portions of the separator of Figures 1 and 2 are supplanted by a series of circumferentially spaced lugs or ears 64 each of which radially projects outwardly from the outer end of one of the annular portions 52 between the ball pockets and out of engagement with the rolling elements as best shown in Figure 4. The outer end of each ear 64 is rounded and may slidably ride in light engagement with a cylindrical land on the outer race ring 62 adjacent to the raceway to radially position the separator as indicated in Figure 4. Fastening members as bolts or rivets 66 extend under tension through and between the axially spaced aligned lugs of each separator half to secure the separator parts together as a unit handling assembly with the end walls 54 in firm abutting engagement. The heads of the fastening members are preferably located in recesses of the ears 64. These fastening members 66 are preferably located radially outwardly of the pitch circle defined by the rolling element centers and the arched separator portion 52—52 is preferably positioned radially inwardly of this pitch circle. The tensions of the fastening members 66 serve to provide a reinforcement in the arched portion 52—52 which prevents detrimental outward separator distortion under very high rotational speeds.

In the illustrated embodiments, the separators are shown as being radially positioned by a light riding contact of the separator against a cylindrical land on one of the race rings. However, it is to be understood that this invention also contemplates a separator construction wherein the separator is located in spaced relation to both race rings and is radially positioned by ball pocket walls which generally conform with the rolling element contour so that the separator is supported by light engagement with the rolling elements as shown in Figure 3.

I claim:

1. In a separator for guiding rolling elements between a pair of relatively rotatable race rings, an annular separator portion having a plurality of circumferentially spaced openings therethrough for receiving and guiding the rolling elements in race ring engagement, a radially outwardly extending projection at each end of the annular portion arranged to engage against one of said race rings, and a plurality of fastening members respectively secured at their ends to the projections and tensioned between said projections in spaced relation to said annular portion, said fastening members producing within said annular separator portion a predetermined radially inwardly directed stress which opposes deformation of the separator under influence of centrifugal forces of high speed rotation.

2. In a separator for positioning rolling elements between a pair of relatively rotatable race rings, an annular separator portion for location between the race rings and provided with a series of circumferentially spaced pockets therethrough for respectively receiving the rolling elements in engagement with said race rings, radially outwardly extending spaced annular projections respectively located at each end of the annular separator portion, a series of circumferentially spaced fastening members secured at their ends to and extending between the projections in radially spaced relation to the annular separator portion, and said fastening members being individually secured under predetermined tension between the projections and producing a radially inwardly directed component of stress within said annular portion which resists separator deformation under the influence of the centrifugal forces of high speed separator rotation.

3. In a separator for positioning rolling elements between a pair of relatively rotatable race rings, one of which has a pair of cylindrical lands, an annular separator portion for location between the race rings and having a series of circumferentially spaced pockets radially extending therethrough for respectively receiving the rolling elements, annular projections radially extending outwardly from the ends of said annular portion and arranged to slidably engage against said cylindrical lands, a series of circumferentially spaced fastening members individually secured at their ends to and tensioned between the opposed projections and spaced radially outwardly from said annular separator portion, and said fastening members being under predetermined tension between the opposed spaced projections to provide a radially inwardly directed component of stress against the intermediate portion of the separator between said projections.

4. In a structure for positioning rolling elements between a pair of relatively rotatable race rings, an annular separator having an intermediate annular portion generally arch-shaped in cross section radially inwardly of the separator, said intermediate annular separator portion having a series of circumferentially spaced pockets extending therethrough for respectively receiving and guiding the rolling elements in engagement with both of said race rings, annular projections extending radially outwardly from the ends of said intermediate annular portion, a series of circumferentially spaced fastening members extending at their ends through and longitudinally tensioned between the projections in radially spaced outward relation to said arch-shaped separator portion between said projections, each fastening member being supported only at its ends, each fastening member being located within a plane extending between a pair of adjacent rolling element pockets, and said fastening members axially stressing the separator and providing within said arch-shaped separator portion a radially inwardly directed component of stress which counteracts the centrifugal forces set up within the separator under conditions of high speed rotation.

5. In an annular separator for positioning rolling elements between a pair of relatively rotatable race rings, an intermediate separator portion generally arch-shaped in cross section radially inwardly of the separator, each end of said separator portion having a radially outwardly extending flange arranged to peripherally engage and be positioned by one of said race rings, said flanges being axially spaced, a series of circumferentially spaced fastening members extending through and tensioned between said spaced flanges in radially outwardly spaced relation to said annular portion, each fastening member being free to flex through the major portion of its unsupported length, and said fastening members providing a radially inwardly directed stress to the separator portion between said flanges which prevents separator distortion under the influence of high speed rotation.

6. In an annular separator for positioning rolling elements between a pair of relatively rotatable race rings, an intermediate separator portion generally arch-shaped in cross section, said intermediate separator portion having a series of circumferentially spaced pockets extending therethrough for respectively receiving the rolling elements in engagement with both of said race rings, annular walls in said pockets generally conforming to the contour of the rolling elements and slidably engageable therewith to support the separator in radially spaced relation between said race rings, circumferentially spaced projections extending radially outwardly from each end of said intermediate separator portion, and a series of circumferentially spaced fastening members longitudinally tensioned between said projections in spaced relation to said intermediate separator portion, said fastening members loosely extending through said projections and axially stressing the separator and providing in said arch-shaped portion a radial stress component which prevents the separator from deformation under the influence of centrifugal forces of high speed separator rotation.

7. In a separator for positioning rolling elements between a pair of relatively rotatable race rings, one of which has a pair of spaced annular lands, a pair of annularly extending similar separator members cooperatively arch-shaped in cross section and having abutting inner end faces, radially outwardly extending flanges at the axial outer ends of the separator members and arranged to position the separator between the race rings by slidable engagement with said lands, the inner ends of the separator members being arcuately recessed in correspondingly located opposed circumferentially spaced positions to provide rolling element receiving pockets therethrough, and circumferentially spaced fastening members longitudinally secured at their ends to and extending through and between said spaced flanges in radially spaced relation to said arch-shaped separator portion, the major length of each fastening member being free to laterally flex, said fastening members being individually secured under predetermined tension between the end projections to oppose and prevent separator distortion under the influence of the centrifugal forces of high speed separator rotation.

8. In a separator for positioning rolling elements between a pair of relatively rotatable race rings one of which has a pair of cylindrical lands, a pair of similar annular separator members cooperatively arch-shaped in cross section radially inwardly of the separator and having abutting inner end faces, spaced radially outwardly extending flanges respectively located at the outer ends of the separator members and slidably engageable with said cylindrical lands, the inner ends of the separator members being correspondingly and arcuately recessed in circumferentially spaced positions to provide circumferentially spaced rolling element receiving pockets therethrough, and circumferentially spaced fastening members secured to and extending under tension between said flanges in radially outwardly spaced relation to the arch-shaped separator portion between said flanges, said fastening members prestressing said arch-shaped separator portion radially inwardly of the separator to strengthen the separator and prevent radial outward distortion of the separator under the influence of centrifugal forces of high speed separator rotation.

9. In a separator for positioning rolling elements between a pair of relatively rotatable race rings, a pair of similar annular separator members having abutting inner end faces, the inner ends of said annular members cooperatively providing an intermediate separator portion arch-shaped in cross section and extending radially inwardly of said members, the inner ends of said members being correspondingly and arcuately recessed in circumferentially spaced opposing relation to provide rolling element-receiving pockets therethrough, said pockets having curved walls generally conforming to the contour of the rolling elements therein and slidably engageable with said rolling elements to support said members between and in spaced relation with both race rings, spaced projections extending radially outwardly from the axial outer ends of said members, and circumferentially spaced fastening members loosely extending through and longitudinally tensioned between said projections and spaced radially outwardly from the arch-shaped separator portion, said fastening members being free to laterally flex through the major portions of their lengths, the fastening members cooperatively holding said members together in unit-handling relation and providing in said intermediate arched separator portion a radially inwardly directed stress which opposes deformation of the members under the influence of centrifugal forces of high speed separator rotation.

References Cited in the file of this patent
UNITED STATES PATENTS

| | | |
|---|---|---|
| 1,411,303 | Schmidt | Apr. 4, 1922 |
| 1,804,110 | Parsons | May 5, 1931 |